United States Patent [19]

Lamb

[11] Patent Number: 5,477,093
[45] Date of Patent: Dec. 19, 1995

[54] PERMANENT MAGNET COUPLING AND TRANSMISSION

[75] Inventor: Karl J. Lamb, Port Angeles, Wash.

[73] Assignee: Magna Force, Inc., Port Angeles, Wash.

[21] Appl. No.: 65,867

[22] Filed: May 21, 1993

[51] Int. Cl.⁶ .................................................. H02K 49/00
[52] U.S. Cl. ............................ 310/75 D; 310/84; 310/92
[58] Field of Search ........................... 310/75 D, 76, 310/77, 78, 84, 92, 93, 96, 97, 90.5, 91; 403/DIG. 1

[56] References Cited

U.S. PATENT DOCUMENTS

| | | | |
|---|---|---|---|
| 2,437,416 | 11/1949 | Bessiero | 172/285 |
| 2,971,105 | 2/1961 | Jaeschke | 310/105 |
| 3,555,321 | 1/1971 | Gruener | 310/93 |
| 3,822,390 | 7/1974 | Janson | 310/104 |
| 4,152,617 | 5/1979 | Janson | 310/103 |
| 4,826,150 | 5/1989 | Minoura | 272/73 |
| 5,105,928 | 4/1992 | Saeki et al. | 192/84 PM |

Primary Examiner—Steven L. Stephan
Assistant Examiner—D. R. Haszko
Attorney, Agent, or Firm—Seed and Berry

[57] ABSTRACT

A magnetic coupler has a magnetic disc containing permanent magnets located between two electroconductive plates and separated therefrom by air gaps. The magnetic disc and electroconductive plates are mounted on coaxial or parallel-spaced input and output shafts so that rotation of the input shaft causes rotation of the output shaft by way of magnetic friction between the permanent magnets and the electroconductive plates.

29 Claims, 10 Drawing Sheets

PERMANENT MAGNET COUPLING AND TRANSMISSION

TECHNICAL FIELD

The present invention relates to magnetic couplers utilizing rotary electroconductive plates and rotary discs containing permanent magnets. When used herein "magnetic couplers" is intended to include magnetic clutches and magnetic brakes.

BACKGROUND OF THE INVENTION

When an electroconductive plate is rotated between two fixed discs containing permanent magnets ("magnetic disc") arranged so that opposing magnets on the discs are of opposite polarity, eddy currents are generated in the rotating plate resulting in magnetic friction between the electroconductive plate and the magnetic discs. Such an arrangement incorporated as a resistance applying means on an exercise bike is disclosed in U.S. Pat. No. 4,826,150. The amount of the drag resulting from the magnetic friction in such a device may be varied by adjusting the relative positions of the magnetic discs between a position in which magnets of opposite polarity are positioned directly opposite one another (maximum magnetic friction) to a position in which magnets of like polarity are positioned directly opposite one another (no magnetic friction). Magnetic friction can also be varied by adjusting the air gaps between the electroconductive plate and the magnetic discs; increasing the gaps decreases the magnetic friction.

It is to be understood that the operation of a load applying device in which an electroconductive plate (copper plate, for example) is rotated relative to a magnetic disc, is different from the operation of a magnetic coupling device in which a ferrous plate is rotated relative to a magnetic disc in that in the latter instance there is a relatively strong axial attraction between the ferrous plate and the magnetic disc which is not present in the other instance between the electroconductive plate and the magnetic disc. It has been found that when a copper plate is rotated relative to a co-axial magnetic disc which is free to rotate and move axially, the magnetic disc will rotate in unison by magnetic friction with the copper plate and will also move axially toward the copper plate as the rotational speed builds up, but will not normally contact the copper plate. Ordinarily a small air gap at least about 3 mm. will be maintained. However, when the rotating plate is ferrous rather than copper, the magnetic plate will move directly into contact with the magnetic plate while stationary or rotating if permitted to do so. This operating distinction is significant in the operation of the present invention.

When a magnetic disc is free to rotate between and independently of a pair of electroconductive plates which are mounted for rotation on a rotary axis coaxial with the rotary axis of the magnetic disc, and the magnetic disc is driven, for example, relative to the electroconductive plates, the plates initially tend to rotationally lock to the disc, but, as previously mentioned, will not physically contact the disc even when free to move axially while rotating. It has been determined that after the electroconductive plates build up rotational speed equal to that of the magnetic disc, and the output shaft coupled to the plates is then abruptly stopped independently of the magnetic disc, the plates and magnetic disc will be axially repelled relative to one another. This is not true when ferrous plates are used instead of electroconductive plates.

In all instances herebefore known to applicant in which an electroconductive plate has been used in association with a magnetic disc for a coupling function, the plate has either been positioned between two magnetic discs as in the previously mentioned U.S. Pat. No. 4,826,150, or has been placed between a disc containing a permanent magnet and a yoke element engaging the disc so as to be magnetized. The latter arrangement is utilized in the speed governor disclosed in U.S. Pat. No. 4,826,150.

To applicant's knowledge the prior art has failed to recognize the advantages and improved efficiency to be gained in magnetic couplers by arranging a magnetic disc or discs between two electroconductive plates so that full utilization can be taken of both poles of the magnets in the discs. The present invention aims to provide improved couplers incorporating this superior arrangement.

SUMMARY OF THE INVENTION

Basically the couplers of the present invention include a disc of permanent magnets or a pair of such discs, confronted on opposite sides by two electroconductive plates spaced by air gaps from the adjacent disc face. Either the magnetic disc(s) or the electroconductive plates may be connected to a power input shaft and to an output (load) shaft. These shafts may be coaxial, or arranged in parallel offset relation so that part of the disc(s) is overlapped by the electroconductive plates.

The practice of the present invention involves the combination of magnetic disc means, electroconductive means, and mounting means for mounting the magnetic disc means and electroconductive means on respective rotary shafts, one of the shafts being a powered input shaft and the other being an output shaft. In some of the embodiments of the invention the input and output shafts are coaxial, and in others the shafts are in offset parallel relationship. The electroconductive means preferably comprises a pair of spaced electroconductive plates which are preferably copper, but may be aluminum or other material with a suitable electroconductive characteristic. The magnetic disc means comprises a disc having a plurality of permanent magnets inserted therein. In some embodiments the magnetic disc means includes a second magnetic disc matching the other disc and coaxial therewith.

The magnetic drag between a magnetic disc and a electroconductive plate for a given air gap therebetween can be increased by increasing the thickness and/or diameter of the plate, and by increasing the number and/or strength of the permanent magnets in the magnetic disc. These variables once set in the design of a coupler, of course are permanent as respects a given coupler. Hence, the potential variable during operation of the coupler is the air gap.

In the practice of the present invention there is no latent magnetic attraction between the magnetic disc and the electroconductive plates. Hence, there is no magnetic resistance to axial movement of the coupler elements relative to one another such as to increase the air gap between an electroconductive plate and adjacent opposing magnetic disc by sliding one relative to the other while magnetically coupled responsive to rotation. This is advantageous because virtually the only load to be overcome in varying the air gap is the mechanical friction involved in sliding a coupler element as, for example, sliding the hub of a magnetic disc or electroconductive plate along a splined stub shaft to vary the air gap. This sliding movement can be controlled so that the air gap is narrowed for magnetic coupling to the load after the powered element (magnetic disc or electroconductive plate) has built up rotational speed.

In some embodiments the two electroconductive plates are coupled together to rotate as a unit mounted on the input or output shaft and with the magnetic disc means mounted on the other shaft. In an alternative arrangement the magnetic disc means operates as an idler between the electroconductive plates, and these plates are mounted one on the input shaft and the other on the output shaft. Also, in some embodiments spring biasing is used so that the air gap is initially relatively narrow, but may increased by magnetic repulsion when rotation of the output shaft is stopped as a consequence for example, of bearing seizure. In still another embodiment the air gap is remotely controlled.

The rotary axes of the magnetic disc and electroconductive plates in the coupler can be in parallel offset relation rather than being coaxial. This offset relationship provides a magnetic coupling having a predetermined speed differential between the input and output shaft.

DETAILED DESCRIPTION OF THE INVENTION

Figure 1:
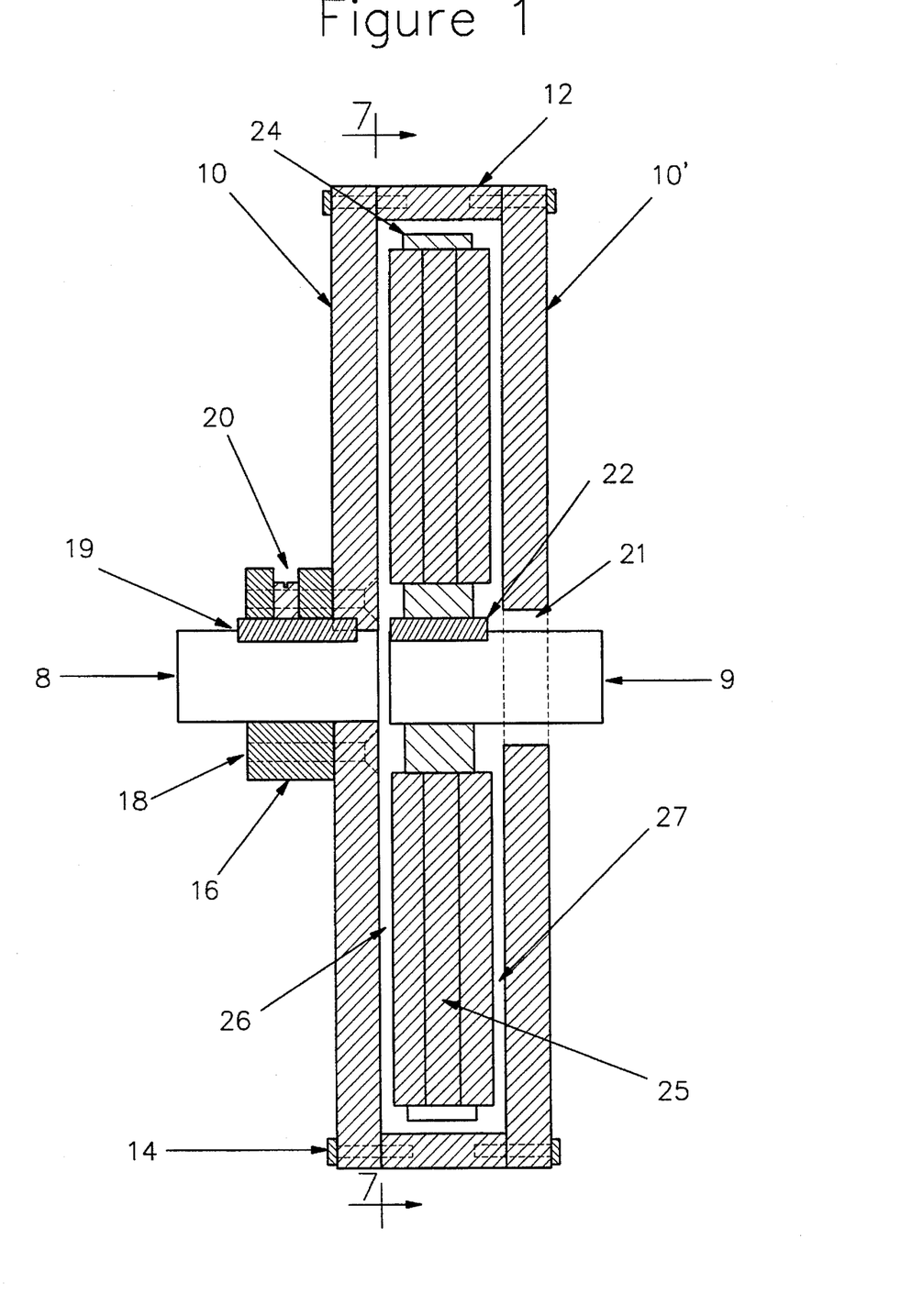
FIG. 1 is a vertical sectional view through a first embodiment of coupler taken longitudinally of the rotary axis and with the input and output shaft shown in longitudinal side elevation.

Referring to the magnetic coupler embodiment of FIG. 1, input and output shafts 8–9 are coaxial and electroconductive plates 10–10' are connected together at their periphery by a connecting ring 12 held in place by bolts 14. Plate 10 has an outer hub 16 secured thereto as by bolts 18, and this hub has a keyway fitting over a key 19 in turn fitting into a keyway at the outer end portion of the input shaft 8. A set screw 20 fixes the position of the plate 10 along the shaft 8. The other electroconductive plate 10' has a center opening 21 for the free passage of the output shaft 9. This shaft has a keyway receiving a key 22 which fits into a keyway presented by the hub 23 of a magnetic disc 24 containing permanent magnets 25. In this coupler embodiment the air gaps 26–27 between the magnetic disc 12 and the electroconductive plates 10–10' are fixed in width.

When the input shaft 8 is rotated about its longitudinal rotary axis, thereby rotating the electroconductive plates 10–10' the magnetic disc 12 responsively picks up speed by way of magnetic friction between the magnetic disc and both of the plates 10–10'. Since there is no physical connection between the shafts 8–9, slippage can occur therebetween, thereby protecting the input shaft and related drive mechanism from overloading caused by locking of the output shaft 9 due, for example, to freezing of a bearing thereon.

Figure 2:
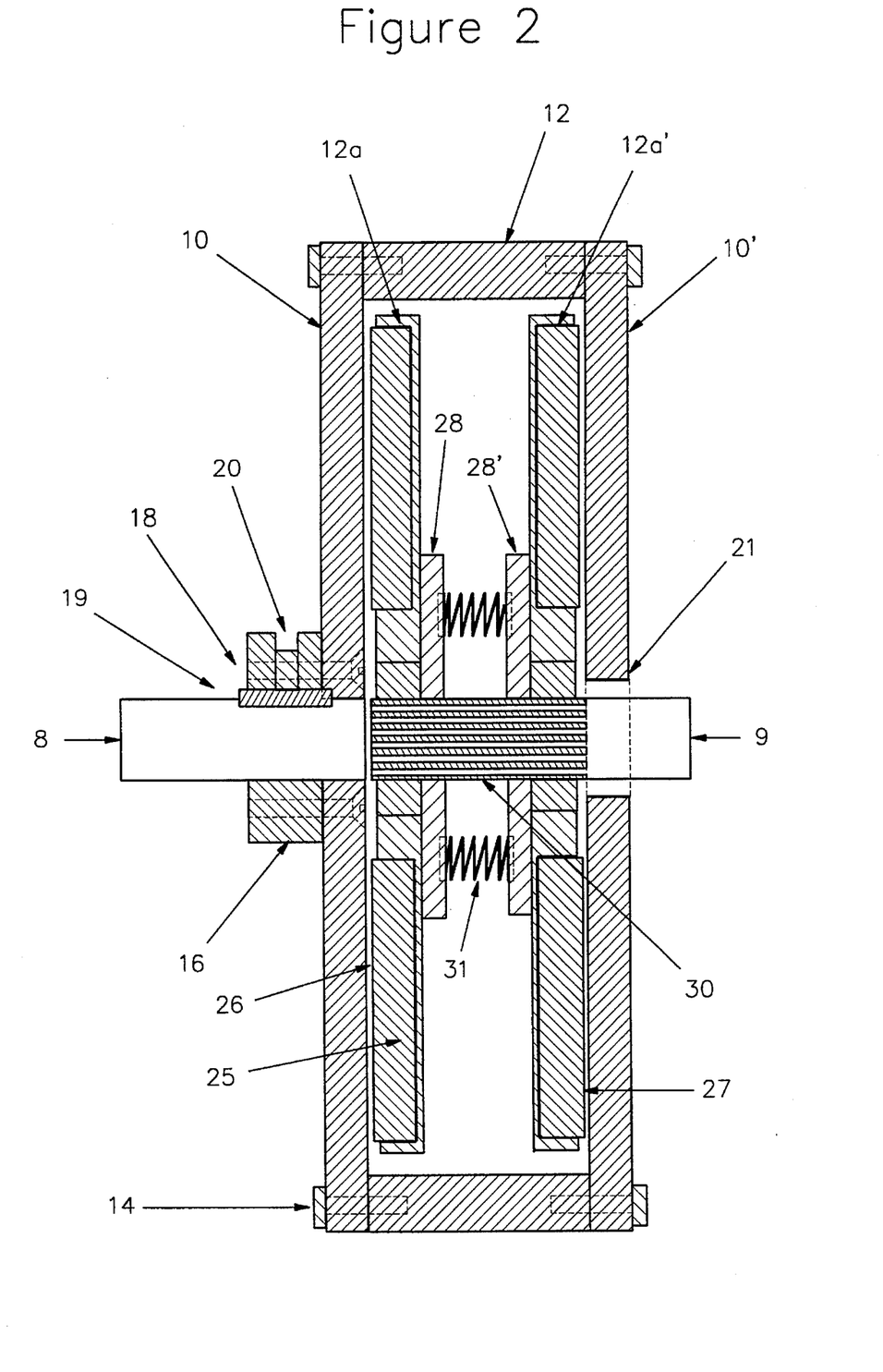
FIG. 2 through 5 show second, third, fourth, and fifth embodiments taken in the same manner as FIG. 1.

In the second embodiment of the invention (FIG. 2) the magnetic disc means comprises a pair of magnetic discs 12a–12a' having opposed hubs 28–28' slidably mounted on splines 30 provided on the output shaft 9. The hubs 28–28' are biased apart by compression springs 31 connected at their ends to the hubs. With this arrangement the air gaps 26–27 between the magnetic discs 12a–12a' and the electroconductive plates 10–10' are initially relatively narrow. Then responsive to acceleration of the input shaft 8 from a rest state, magnetic forces determine the minimum air gap between the magnetic discs 12a–12a' and the electroconductive plates 10–10', and the output shaft is driven by magnetic friction at substantially the same speed as the input shaft. If the output shaft seizes, thereby causing slippage to occur between the electroconductive plates 10–10' and the magnetic discs 12a–12a', the air gaps 26–27 responsively widen as a consequence of resulting repulsion of the permanent magnets in the discs 12a–12a' relative to the electroconductive plates 10'. This repulsion acts counter to the bias of the compression springs 31.

In the third embodiment (FIG. 3), the electroconductive plates 10–10' are provided with hubs 32–32' secured thereto by a plurality of bolts 33–33'. The hubs 32–32' have a keyway fitting over respective keys 34–34', in turn fitting keyways at the opposing end portions of the input and output shafts 8–9. The input shaft 8 projects beyond the plate 10 to receive a bushing 36 in the hub of a magnetic disc 24'. This bushing 36 is free to rotate on the input shaft. Hence, the bushing and magnetic disc 24' comprise an idler rotor assembly permitting the disc 24' to rotate relative to the input shaft 8 and electroconductive plate 10. Adequate spacing is provided between the plates 10–10' to leave space for air gaps 26–27 between the plates and the magnetic disc 24'.

Figure 3:
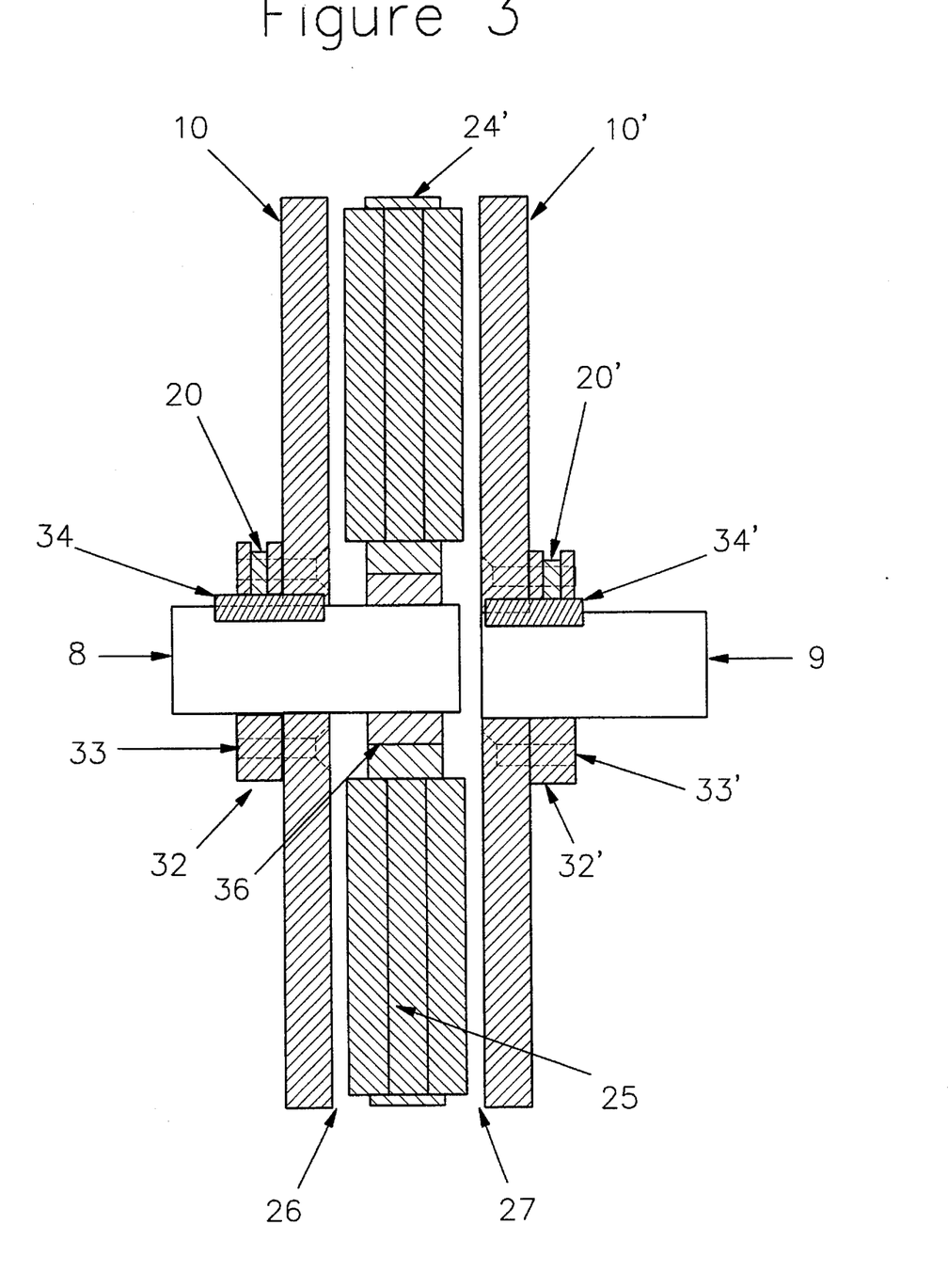

In operation of the third embodiment rotation of the input shaft 8 results in magnetic friction between the electroconductive plate 10 and the magnetic disc 24', and the resulting rotation of the magnetic disc causes rotation of the output shaft 9 by way of magnetic friction between the disc 24' and electroconductive plate 10'. If the output shaft 9 seizes, the coupler permits the magnetic idler disc 24' and plate 10' to turn relative to the input shaft 8 and relative to one another.

In the fourth embodiment (FIG. 4) the electroconductive plate 10 is connected to the input shaft 8 in the same manner as in the first embodiment, but is not connected to the other electroconductive plate 10'. The latter has a hub 38 slidemounted on splines 40 provided by the output shaft 9 and is biased by a compression spring 42 toward the input shaft 8. A collar 43 is fixed by a set screw 44 on the output shaft 9 to serve as a seat for the spring 42. Also slide,mounted on the splines 40 is a bearing unit 46 mounted in a magnetic disc 24" so that the latter is an idler. The splined end portion of the output shaft 9 projects into close proximity with the input shaft 8.

Figure 4:
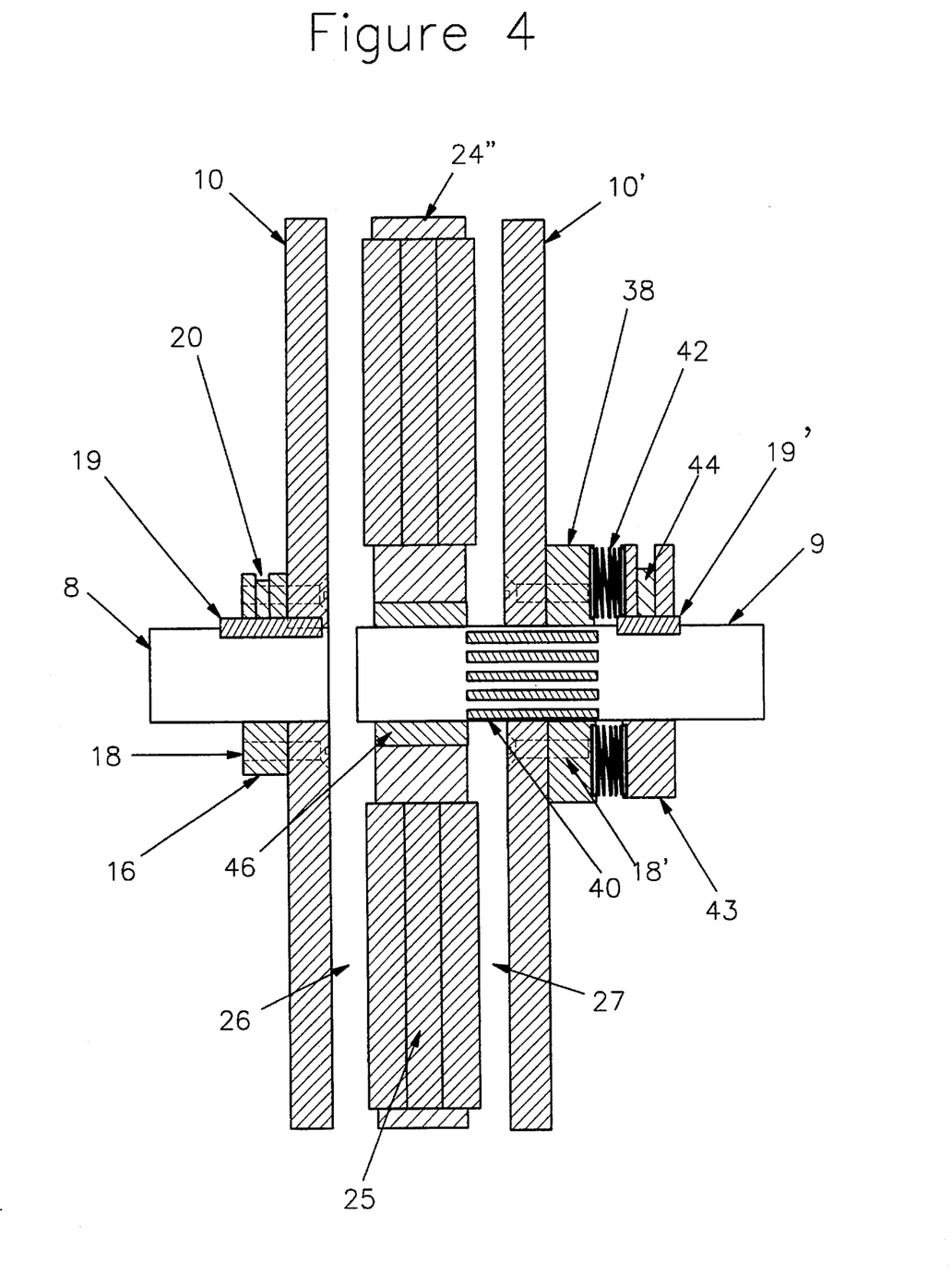

When the fourth embodiment is in operation by rotation of the input shaft 8, the magnetic disc 24" is attracted to the electroconductive plate 10 and slides on the output shaft 9 while commencing rotation responsive to magnetic friction. The magnetic disc 24" self establishes a minimum air gap from the plate 10. As the disc 24" builds up speed to that of the plate 10, magnetic attraction and magnetic friction between the disc 24" and the electroconductive plate 10' causes the plate 10' to rotate and to slide with the disc 24"

toward the other plate 10. If the output shaft 9 seizes, thereby stopping rotation of the electroconductive plate 10', the resulting repulsion between the disc 24" and the plate 10' because of the sudden difference in their relative speeds forces the plate 10' away from the magnetic disc in opposition to the spring 42 which remains free to rotate with the other plate 10.

When a magnetic disc is an idler journaled on a hub which is free to slide as a floater coaxially between two coaxial electroconductive plates, one of which is motor-driven and the other of which is connected to a load, the magnetic disc normally occupies a position midway between the electroconductive plates when the rotational speed of the plates is equal. However, if the air gap between the magnetic disc and the motor-driven electroconductive plate or the load-connected electroconductive plate is too great, the load-connected electroconductive plate will not be driven at the same speed as the motor-driven plate due to slippage of the motor-driven plate relative to the magnetic disc. It has been found that in this situation the magnetic disc normally drifts toward the load-connected electroconductive plate such that the air gap between the magnetic disc and the motor-driven plate is larger than the gap between the magnetic disc and the load-connected plate. If the sum of the air gaps is then gradually decreased, thereby decreasing the gap between the motor-driven electroconductive plate and the magnetic disc, the rotational slippage therebetween decreases and the speed of the magnetic disc and the load-connected plate responsively increases. The air gap between the magnetic disc and the motor-driven electroconductive plate will remain larger than the gap between the magnetic disc and the load-connected magnetic plate until the rotational slippage decreases to zero, a condition achieved when the gaps are small enough for the coupling to drive the load at the same speed as the motor.

Figure 5:
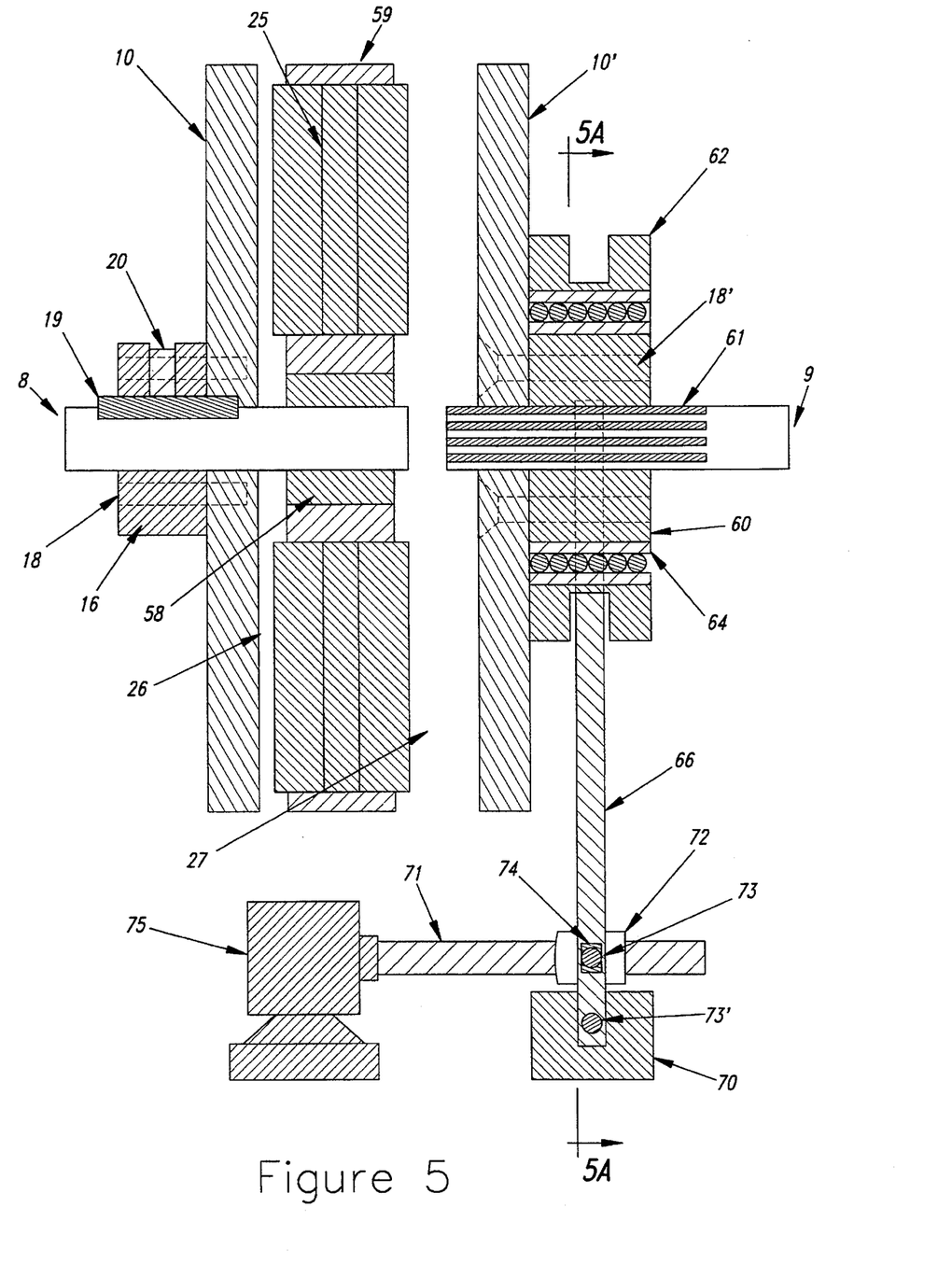
Figure 5A:
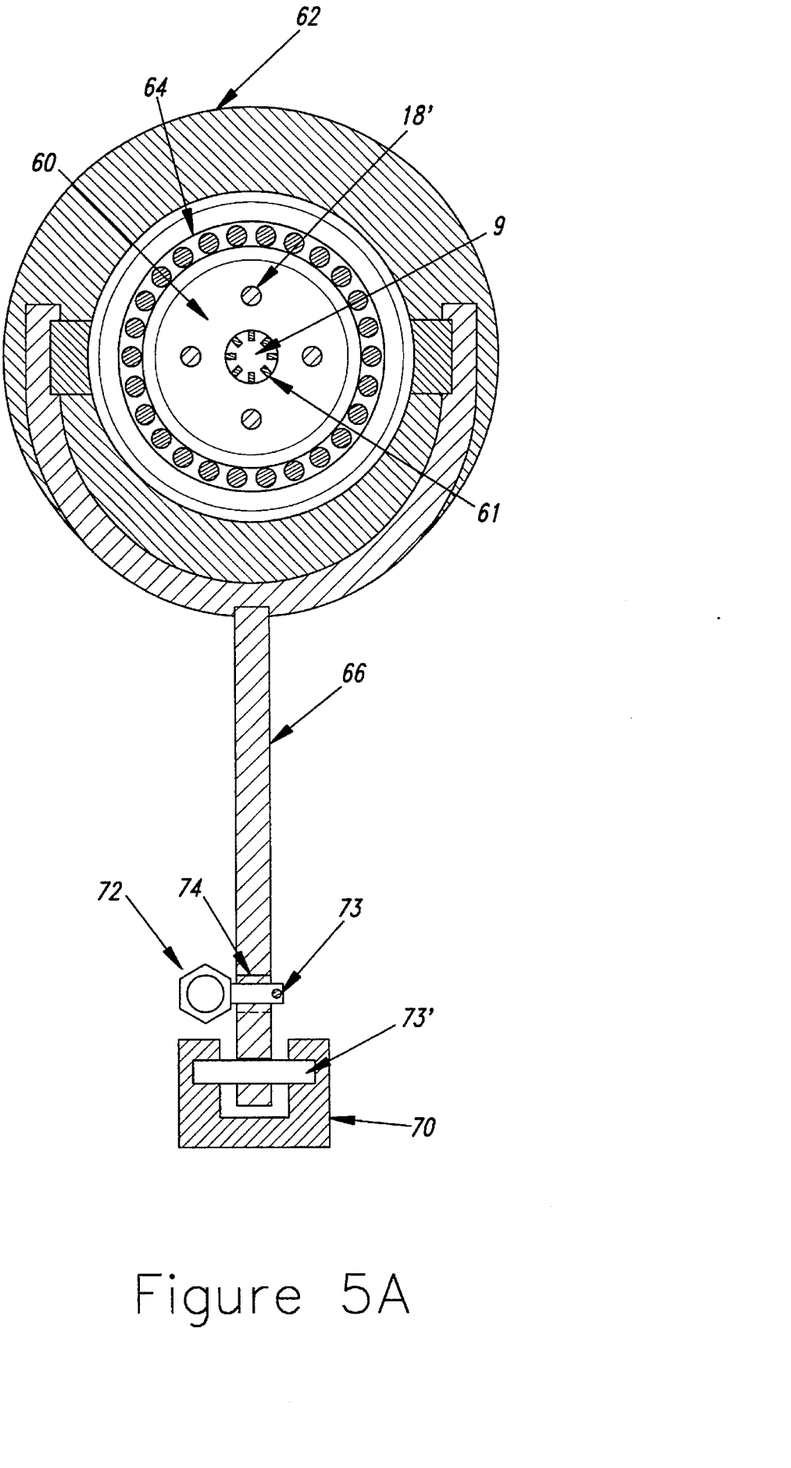
FIG. 5A is a transverse sectional of the fifth embodiment taken as indicated by line 5A—5A in FIG. 5.

The described discovered phenomena can be utilized as a clutch type of coupler for gradually applying a load to a motor after the motor is at full speed as will now be explained by reference to a fifth embodiment (FIG. 5). In this embodiment the input shaft 8 is extended beyond the electroconductive plate 10 and functions as a journal for a bushing 58 in a magnetic disc 59 thereby free to rotate as an idler independently of the input shaft 8 and the plate 10. Electroconductive plate 10 has a hub 60 slide-mounted on splines 61 on the output shaft 9 so that the plate 10' is coupled to the output shaft, but is free to slide therealong. A circumferentially grooved collar 62 is mounted by a throw-out bearing 64 on the output shaft 9 so that the collar 62 is free to slide along the output shaft without rotating. A yoke member 66 interfits with the circumferential groove 63 in the collar 62 and is swing-mounted at its opposite end by a pivot pin 68 on a mounting block 70. Movement of the yoke member 66 to responsively slide the collar 62 on the output shaft 9 is controlled by a servo motor 70 having a threaded shaft 71 extending through a nut 72 which has a pin 73 extending through a slot 74 in the arm of the yoke member. By this arrangement the electroconductive plate 10' can have a slide range between a no-load transfer position in which the air gap between the magnetic disc and plate 10' is so large that the plate 10' remains at rest when the input shaft 8' is turning at full speed, and a full-load transfer position is which said air gap is small enough for full-speed driving of the load-connected electroconductive plate 10' via the magnetic disc. In this range there can be controlled slippage of the load-connected plate 10' relative to the plate 10 and magnetic disc to provide speed adjustment of the load while the driving motor operates at constant speed.

As an alternative to the arrangement illustrated in FIG. 5, the output shaft 9 can become the input shaft and vice versa. Also, as another alternative, the magnetic disc 59 can be mounted as an idler on an extension of the output shaft 9 rather than on an extension of the input shaft 8.

Figure 6:
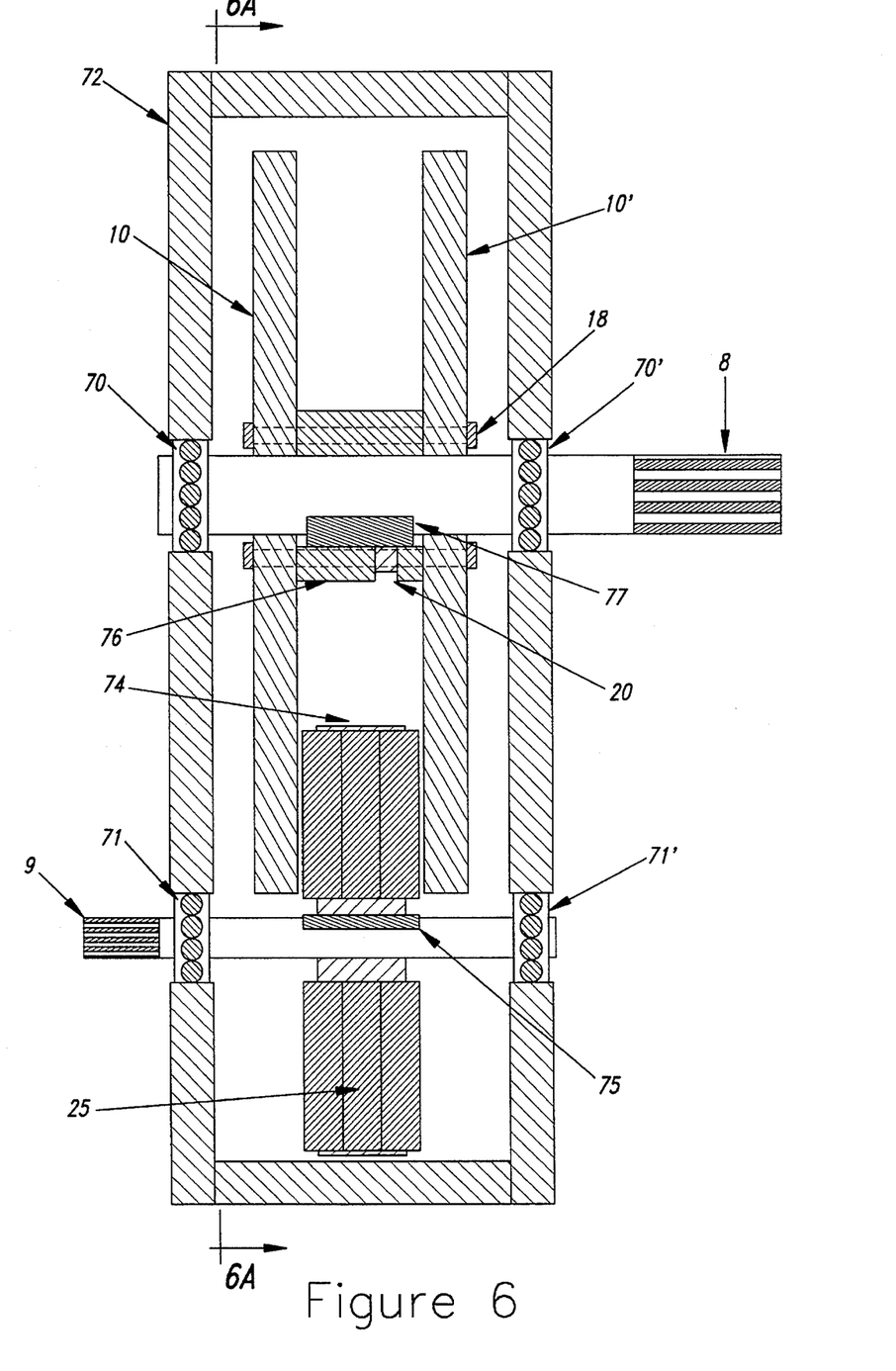
FIG. 6 is a vertical sectional view of a sixth embodiment taken in the same manner as FIG. 1, and with the input and output shafts offset from one another.
Figure 6A:
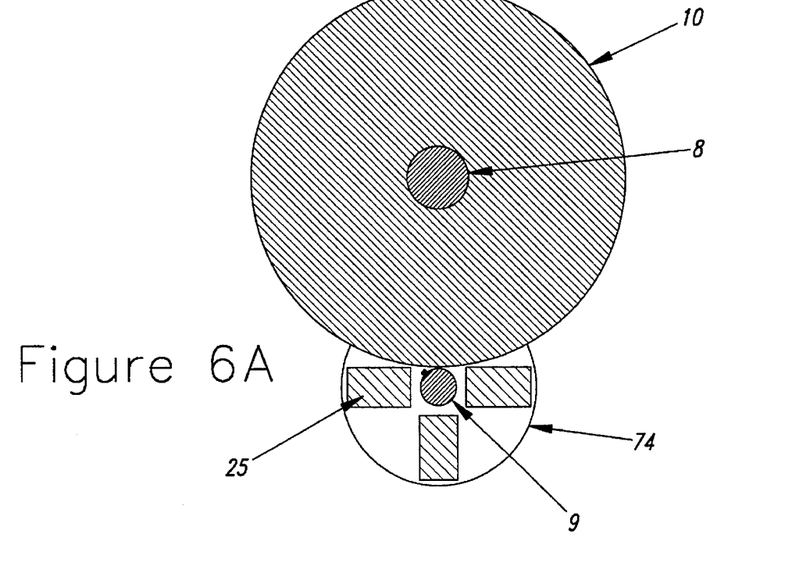
FIG. 6A is a transverse sectional view taken as indicted by line 6A—6A in FIG. 6.
Figure 6B:
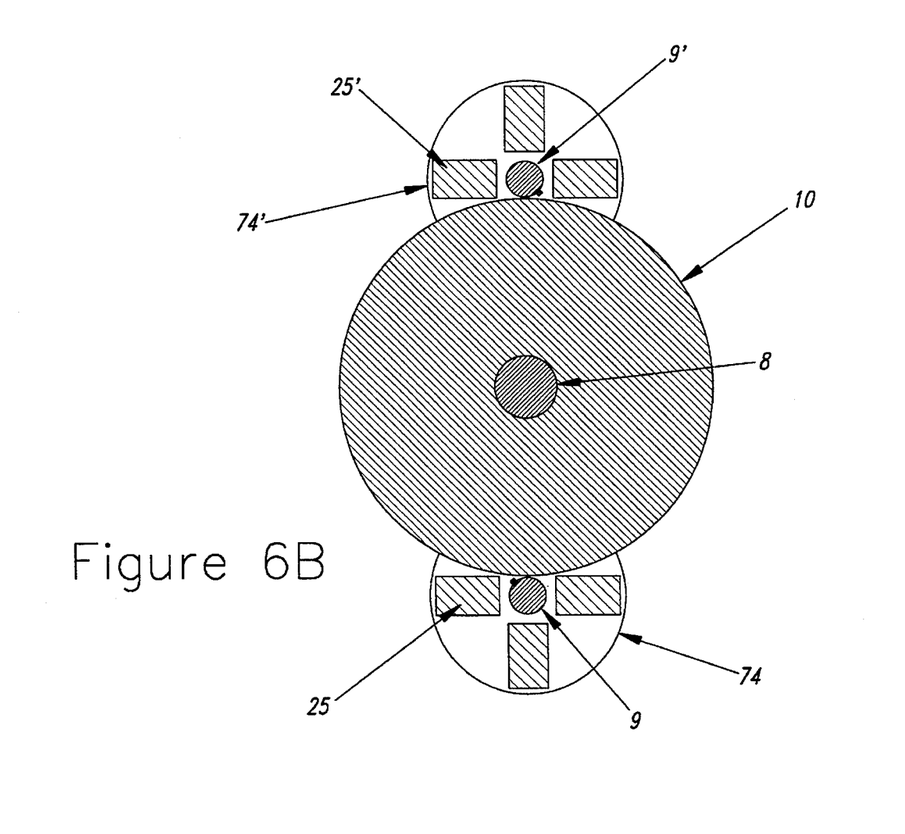
FIG. 6B is a transverse sectional view taken like FIG. 6A and illustrating a further embodiment.

The sixth embodiment (FIGS. 6, 6A) illustrates an example in which the input shaft 8 and output shaft 9 are not coaxial. In this embodiment two pairs of bearings 70–70' and 71–71' are mounted in a housing 72 for receiving the shafts 8–9. A magnetic disc unit 74 is fitted by a key 75 on the output shaft 9, and the electroconductive plates 10–10' together with a spacer 76 are fitted by a key 77 on the input shaft 8. With this arrangement the plates 10–10' partly overlap the magnetic disc 74 and rotation of the input shaft 8 causes rotation of the output shaft 9 by way of magnetic friction between the magnetic disc 74 and electroconductive plates 10–10'. However, because in the illustrated example, the plates 10–10' are larger in diameter than the disc 74, the output shaft 9 will rotate proportionately faster similar to meshed gears having different pitch diameters. It will be appreciated, as shown in FIG. 6B that a second output shaft 9' can be provided which is coupled to another magnetic disc 74' which is partly overlapped by the electroconductive plates 10–10'.

The permanent magnets used in the magnetic disc units are preferably of the rare earth type, and namely, the lanthonides such as samarium cobalt and neodymium iron boron. These magnets have magnetic properties exceeding the arnico and ceramic types. The magnets may be rectangular or circular in cross-section, for example, and are bonded into complementing openings provided in a disc which may be plastic, metal or ceramic. The magnets are arranged symmetrically with adjacent magnets arranged so that they present opposite poles on each side of the disc. The magnets can also be stacked end for end, positive pole opposite negative pole, in the disc openings.

Figure 7:
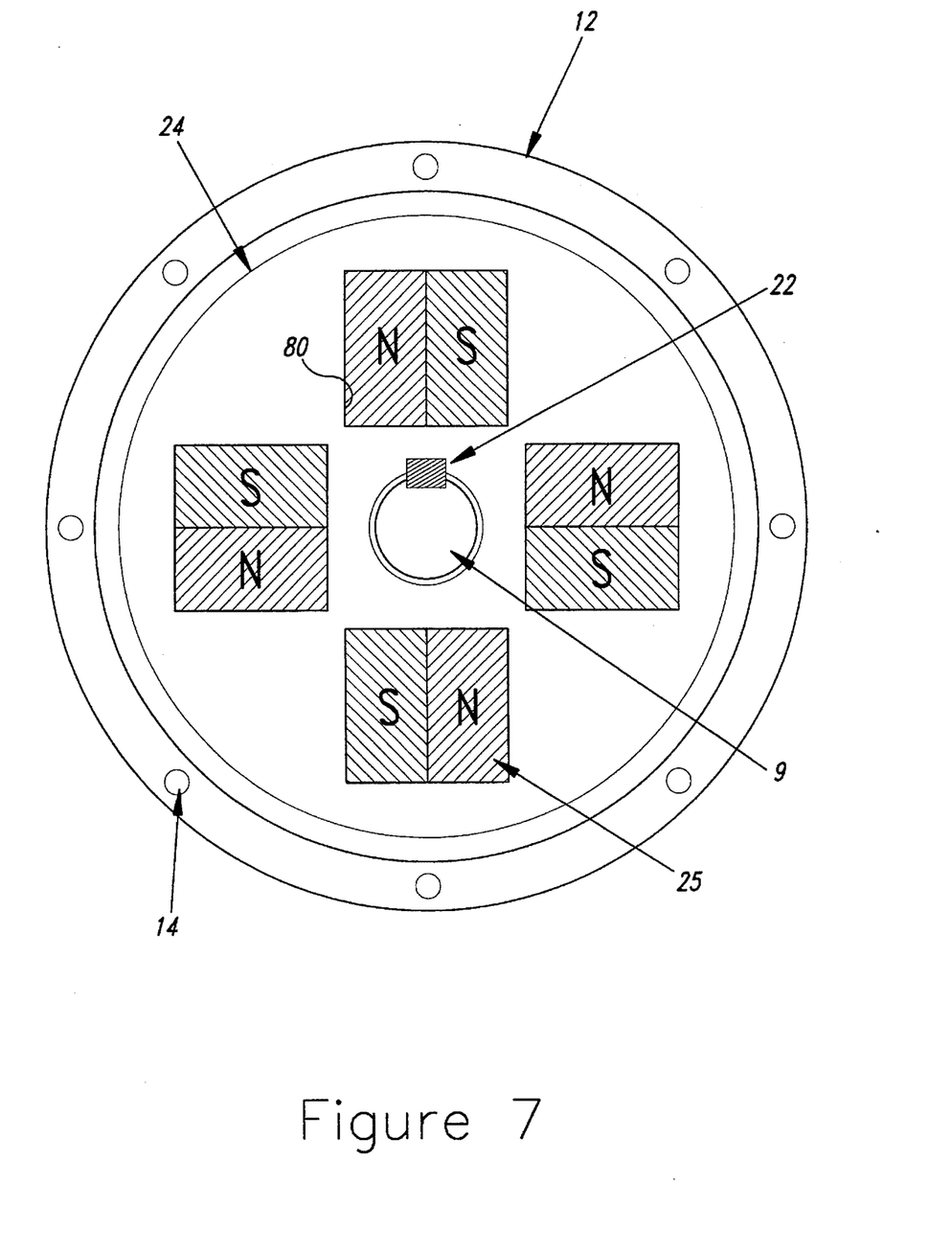
FIG. 7 illustrates a magnetic disc unit in elevation and is taken as indicted by line 7—7 in FIG. 1.

FIG. 7 illustrates the magnetic disc example in FIG. 1 in which four evenly spaced rectangular openings 80 are provided in the disc 24 to receive four sets of permanent magnets 25. Each set comprises two side-by-side stacks of rectangular magnets with three magnets per stack. The pairs in each set have their poles arranged oppositely from one another, i.e., one pair has its poles arranged in a N-S-N-S-N-S order from one face of the disc to the other face, whereas the adjoining pair has its poles arranged in a S-N-S-N-S-N order. Preferably, the magnets project a short distance beyond the faces of the disc.

The FIG. 7 example of magnetic disc was successfully used in a FIG. 5 coupling, for example, in experiments in which a 5 hp. synchronous motor, 3600 rpm, was used to drive a centrifugal pump. The electroconductive plates were copper, ½ inches thick, with an 8 inch diameter, and the magnetic disc was of the same diameter and had a thickness of 1-⅛". The permanent magnets were each 1×2 inches, and ½ inch thick, stacked in threes so that each magnet projected 3/16 inches beyond a respective face of the disc.

Figures 8, 9:
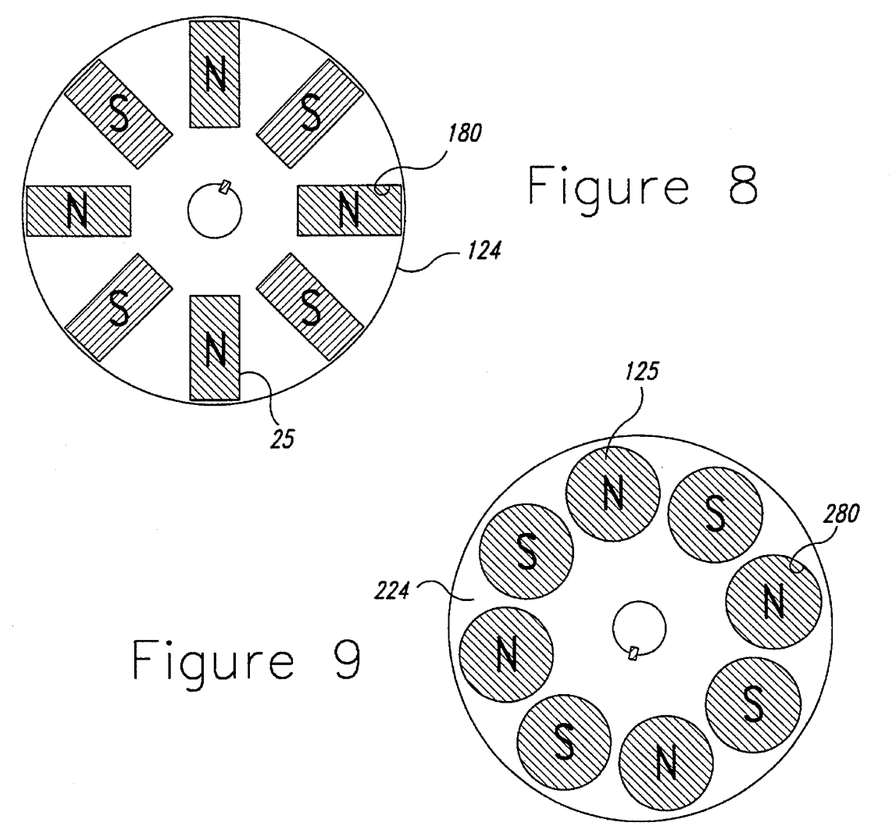
FIG. 8, 9 and 10 illustrate three alternative arrangements of permanent magnets on a magnetic disc viewed as in FIG. 7.
Figure 10:
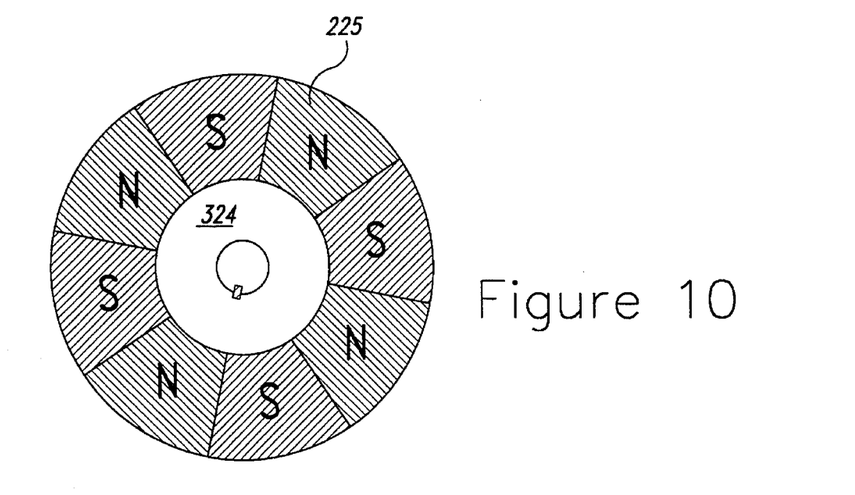

FIG. 8 illustrates an alternative magnetic disc example utilizing rectangular permanent magnets 25 arranged with alternating north-south poles in equally spaced relation in a circular pattern in rectangular openings 180 in a disc 124. FIG. 9 illustrates a similar arrangement with circular permanent magnets 125 mounted in circular holes 280 in a disc 224. FIG. 10 shows a further example in which side-by-side permanent magnet sectors 225 are arranged in a ring on each side of a disc 324.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A coupler comprising:

input and output shafts mounted independently of one another;

a rotary member containing permanent magnets;

two connected rotary electroconductive elements positioned on opposite sides of said rotary member and normally separated therefrom by respective air gaps:

said electroconductive elements and said rotary member being mounted on said shafts whereby rotation of said input shaft causes rotation of said output shaft, without direct transfer of vibration between said shafts, by way of magnetic action between the permanent magnets on said rotary member and said electroconductive elements, there being substantially no magnetic attraction between said magnets and said electroconductive elements when said shafts are stationary.

2. A coupler comprising:

a rotary electroconductive unit mounted to rotate on a first rotary axis;

a rotary magnet unit containing permanent magnets and mounted to rotate on a second rotary axis which is in spaced parallel relation to said first rotary axis;

said units having an overlap zone in which they are separated by an air gap, said permanent magnets being arranged to pass through said overlap zone when said rotary disc is rotated.

3. A coupler according to claim 1 in which said shafts, rotary member and electroconductive elements are coaxial.

4. A coupler according to claim 1 in which said shafts have rotary axes which are laterally spaced apart.

5. A coupler according to claim 2 in which said electroconductive unit comprises a pair of coaxial electroconductive plates extending into said overlap zone on opposite sides of said rotary magnet unit and each spaced by a respective air gap from said magnet unit.

6. A coupler according to claim 2 in which a second rotary magnet unit containing permanent magnets is mounted to rotate on a third rotary axis which is in spaced parallel relation to said first and second rotary axes;

said second magnet unit and electroconductive unit having a second overlap zone in which they are separated by an air gap, said permanent magnets on said second magnet unit being arranged to pass through said second overlap zone when said second rotary magnet unit is rotated.

7. A coupler according to claim 6 in which said electroconductive unit comprises a pair of coaxial electroconductive plates extending into both of said overlap zones on opposite sides of said rotary magnet units and each spaced by respective air gaps from said magnet units.

8. A coupler assembly comprising:

input and output shafts;

a magnetic unit containing permanent magnets mounted on one of said shafts to turn therewith;

a second unit having two rotary electroconductive elements positioned on opposite sides of said magnetic unit and separated from said magnets by respective air gaps, said second unit being mounted on the other of said shafts to turn therewith, whereby rotation of said input shaft causes rotation of said output shaft by way of drag resulting from bridging of said gaps by magnetic flux from said magnets, said shafts being mounted independently of one another, there being substantially no magnetic attraction between said magnetic unit and said electroconductive elements when said shafts are stationary.

9. A coupler for first and second rotary shafts aligned on a rotary axis, said coupler comprising:

a rotary disc assembly containing permanent magnets and arranged to rotate about said axis;

and first and second electroconductive rotary plates positioned at opposite sides of said disc assembly and separated therefrom by respective air gaps, said plates also being mounted to rotate about said axis, said first plate being mounted on said first shaft to rotate therewith, and said second plate being coupled to said second shaft to rotate therewith, and being slide-mounted on said second shaft;

said disc assembly being arranged as an idler on said second shaft and also being slide-mounted thereon;

and an adjustment mechanism for axially adjusting the position of said second plate on said second shaft to thereby vary the sum of the air gaps between said disc assembly and said electroconductive plates, there being magnetic action between said magnets and plates responsive to rotation of one of said shafts relative to the other shaft, and substantially no magnetic attraction between said magnets and plates when said shafts are stationary.

10. A coupler according to claim 9 in which said adjustment assembly comprises a collar fixed on said second shaft outwardly of said second electroconductive plate, and biasing means between said fixed collar and said second plate for biasing said second plate toward said fixed collar.

11. A coupler according to claim 10 in which said biasing means comprises a compression spring.

12. A coupler according to claim 9 in which said adjustment mechanism comprises a slide unit which is slide-mounted on said second shaft and engages said second electroconductive plate, and a control element engaging said slide unit for selectively urging it to move along said second shaft and thereby adjust the position of said second plate.

13. A coupler comprising:

a magnetic disc assembly concentric to a rotary axis and containing permanent magnets;

electroconductive plates axially aligned on opposite sides of said disc assembly and normally separated therefrom by respective air gaps, said plates being coupled together outwardly away from said disc assembly;

rotation means for rotating said disc assembly relative to said plates on said rotary axis without directly transferring vibration, there being substantially no magnetic attraction between said magnets and said plates when said rotation means is inactive;

and means for adjusting said air gaps.

14. A combination according to claim 13 in which said magnetic disc assembly is mounted on a rotary shaft having said rotary axis as its rotary axis.

15. A combination accordingly to claim 14 in which one of said electroconductive plates is mounted on a second rotary shaft also having said rotary axis as its rotary axis, said second shaft being independent of said first shaft.

16. A coupler according to claim 13 in which said magnetic disc assembly comprises a disc member having a plurality of permanent magnets mounted thereon in spaced relation to one another, adjacent of said magnets having their poles reversed relative to one another.

17. A coupler according to claim 13 in which said magnetic disc assembly comprises a pair of coaxial magnetic discs containing permanent magnets and slide-mounted relative to one another, said discs being biased apart toward respective of said electroconductive plates.

18. A coupler comprising:

rotary first and second electroconductive units arranged in spaced-apart coaxial relationship on a rotary axis, said first unit being arranged to be driven by a rotary power source and said second unit being structured to be coupled to a rotary load;

a permanent magnet assembly positioned between said electroconductive units and separated therefrom by air gaps, said magnet assembly being mounted to rotate independently about an axis parallel to said rotary axis for transferring rotational energy from said first unit to said second unit by magnetic action between said magnet assembly and said units, there being substantially no magnetic attraction between said permanent magnet assembly and said electroconductive units when they are stationary.

19. A coupler according to claim 18 in which adjustment means is provided for varying the distance between said electroconductive units.

20. A coupler according to claim 18 in which adjustment means is provided for varying one of said air gaps.

21. A coupler according to claim 18 in which said rotary axis and said axis of the permanent magnet assembly are coaxial.

22. A coupler according to claim 18 in which said rotary axis and said axis of the permanent magnet assembly are spaced apart, and the latter said axis is spaced from said electroconductive means.

23. A coupler according to claim 22 in which said permanent magnet assembly is free to move axially relative to said electroconductive units.

24. A coupler according to claim 18 in which said permanent magnet assembly includes a rotary disc in which permanent magnets are mounted each with its poles directed oppositely toward respective of said electroconductive units, adjacent of said magnets having their poles reversed relative to one another.

25. A coupler according to claim 18 in which each of said electroconductive units comprises a copper plate.

26. A coupler according to claim 18 in which said electroconductive units are mounted on respective coaxial shafts on said rotary axis, one of said shafts having a projecting portion projecting beyond its respective electroconductive unit toward the other shaft, and said permanent magnet assembly being mounted on said projecting portion and being free to rotate relative thereto.

27. A coupler according to claim 26 in which said permanent magnet assembly is also free to move endwise on said projecting portion.

28. A coupler according to claim 27 in which said projecting portion is on the shaft on which said second electroconductive unit is mounted.

29. A coupler according to claim 8 in which said shafts have axially aligned rotary axes and are spaced apart axially.

* * * * *